United States Patent [19]

Mizoshita et al.

[11] Patent Number: 5,777,827
[45] Date of Patent: Jul. 7, 1998

[54] HORIZONTAL TYPE MAGNETO-RESISTIVE HEAD USING FLUX GUIDE

[75] Inventors: Yoshifumi Mizoshita; Takao Koshikawa; Hitoshi Kanai; Junichi Kane; Yoshinori Otsuka; Yukinori Ikegawa, all of Kawasaki, Japan

[73] Assignee: Fujitsu Limited, Kawasaki, Japan

[21] Appl. No.: 709,270

[22] Filed: Sep. 6, 1996

Related U.S. Application Data

[62] Division of Ser. No. 435,379, May 5, 1995, Pat. No. 5,583, 726, which is a continuation of Ser. No. 938,163, filed as PCT/JP92/01363, Oct. 20, 1992, 1992, abandoned.

[30] Foreign Application Priority Data

Oct. 21, 1991 [JP] Japan .................. 3-272370

[51] Int. Cl.$^6$ .................................................. G11B 5/33
[52] U.S. Cl. .................................................. 360/113
[58] Field of Search .................. 360/113, 125, 360/126; 338/32 R; 324/252

[56] References Cited

U.S. PATENT DOCUMENTS

| | | | |
|---|---|---|---|
| 4,425,593 | 1/1984 | Postma | 360/113 |
| 4,881,143 | 11/1989 | Bhattacharyya et al. | 360/113 |
| 4,907,113 | 3/1990 | Mallary | 360/113 |
| 5,111,352 | 5/1992 | Das et al. | 360/113 |
| 5,164,869 | 11/1992 | Fontana, Jr. et al. | 360/113 |
| 5,168,408 | 12/1992 | Lazzari | 360/113 |
| 5,193,039 | 3/1993 | Smith et al. | 360/113 |
| 5,241,439 | 8/1993 | Michalek et al. | 360/113 |
| 5,270,895 | 12/1993 | Ruigrok et al. | 360/113 |

FOREIGN PATENT DOCUMENTS

| | | |
|---|---|---|
| 62-291 713 | 5/1988 | Japan . |
| 0 132 912 | 5/1989 | Japan . |

OTHER PUBLICATIONS

Tsang et al., Study of Recessed MR Sensors With Unlaminated And Multi–Laminated Flux–Guides, Sep. 1992, IEEE Transactions on Magnetics, vol. 28, No. 5, pp. 2289–2291.

Primary Examiner—Stuart G. Levy
Assistant Examiner—William R. Korzuch
Attorney, Agent, or Firm—Armstrong, Westerman, Hattori, McLeland & Naughton

[57] ABSTRACT

A magneto-resistive (MR) head has an MR layer in a space formed by shield layers by providing a distance enough to protect magnetic flux, flowing through the MR layer from a recording medium through a gap formed by the shield layers, from leaking out to the shield layers. A flux guide is provided between the MR layer and the gap, and has an end magnetically connected to the MR, extending over an effective area of the MR head, and another end having a width a little narrower than a width of track of the recording medium. A side of the MR layer, opposite to the side connected with the flux guide layer is placed in a narrow space formed at a corner of the space. Magnetic flux leaked from the gap due to a sense current flowing through the MR layer is eliminated by making a current flow through a recording coil layer or through an electrically conductive layer placed in the space.

4 Claims, 8 Drawing Sheets

HORIZONTAL TYPE MAGNETO-RESISTIVE HEAD USING FLUX GUIDE

This is a divisional of application Ser. No. 08/435,379 filed May 5, 1995, now U.S. Pat. No. 5,583,726 which is a continuation of application Ser. No. 07/938,163 filed Dec. 3, 1992, now abandoned, which is a 371 of PCT/JP92/01363 filed Oct. 20, 1992.

TECHNICAL FIELD

The present invention relates to a magnetic head of a magnetic disk or tape apparatus for recording a signal into a recording medium such as the magnetic disk or tape and reproducing the recorded signal from the recording medium, and in particular the present invention relates to a magneto-resistive head provided in the magnetic head, for reproducing the recorded signal by using a magneto resistive element.

BACKGROUND ART

As the magnetic recording apparatus becomes small in size and comes to have a large capacity of recording, the magnetic head used in the apparatus is required to be small in size and to have a character to have high density in recording and high efficiency in reproducing. Complying with the requirement, the thin layer process technology used in the LSI device fabrication is applied to fabricate the magnetic head. The magneto-resistive head, which will be simply called "MR head" hereinafter, is a magnetic read head used only for the signal reproduction. The MR head includes a magneto-resistive element, which will be called "MR element" hereinafter, operating under the well-known magneto-resistive effect and has begun to be used greatly. Because, the MR head has a character of reproducing a high output signal voltage in comparison with a usual inductive type head, and the signal reproducing can be performed independently of the velocity of the recording medium.

However, as the size of the magnetic head becomes small because of the advance of the thin layer process technology, the size of the MR element and a magnetic circuit associated with the MR element becomes small. Therefore, the MR head has been required to have high detectivity of the magnetic flux given from the recording medium. The detectivity is generally called "reproducing efficiency" in the MR head.

The magnetic head has two kinds, a separated head and a composite head. In the separated head, a reproducing section including the MR element is separated from a recording section. In the composite head, the reproducing and recording sections are composed such that a magnetic core of the recording section is used as a magnetic shield of the reproducing section commonly.

Furthermore, the magnetic head is classified into two types from a view point of fabrication, a conventional type and a horizontal or a planer type. In either type, the magnetic head is fabricated with the thin layer process technology. That is, a plurality of magnetic heads are fabricated on a flat substrate as a wafer, and the wafer is precisely cut for producing a plurality of magnetic heads separately. Each of the magnetic heads has a surface faced to the recording medium for guiding the recording medium running, which will be called "guide surface" hereinafter, and a magnetic flux in-out gap placed at the guide surface. The guide surface is for allowing the recording medium to run thereabove, providing a very small space such as 0.1 micro-meter between the guide surface and the running recording medium. The magnetic flux read-write gap, which will be

2 simply called "gap" hereinafter, is for making magnetic flux input from the running recording medium to the magnetic head in a recording made and output from the magnetic head to the running recording medium in a reproducing mode. The size of the gap is approximately 0.4 micro-meter.

Thence, in the case of the conventional type, the magnetic head is fabricated so that the guide surface including the gap is provided at a cut surface of the wafer. In other words, the guide surface appears on the cut surface perpendicular to the surface of the substrate.

While, in case of the horizontal type, the magnetic head is fabricated so that the guide surface including the gap is provided in parallel to the surface of the substrate.

A problem commonly appearing in all kinds and types of the magnetic head in the prior art is that the reproducing efficiency decreases as the size becomes small because of the thin layer process technology. Another problem appearing in the conventional type magnetic head is that magnetic flux, which will be called "leakage flux" hereinafter, leaking from the MR element to the running recording medium through the gap, damages magnetized substances recorded on the recording medium in the reproducing mode, due to a sense current flowing through the MR element.

DISCLOSURE OF THE INVENTION

Therefore, a first object of the present invention is to increase the reproducing efficiency of the MR head in the conventional and horizontal types of the magnetic head, and a second object of the present invention is to extinguish the leakage magnetic flux due to the sense current.

In the conventional type of the magnetic head, the first object is accomplished by decreasing magnetic reluctance of a magnetic circuit including the MR element and the second object is accomplished by providing means for extinguishing the magnetic flux due to the sense current to the magnetic head. The magnetic reluctance in the conventional type is decreased by improving magnetic structure nearby the MR element and magnetic connection lying in the magnetic circuit including the MR element. The second object is accomplished by making a current flow through a coil used in the recording mode, for extinguishing the leakage flux or by additionally providing an electrically conductive layer to the magnetic head for extinguishing the leakage flux by a current flowing through the conductive layer.

In the horizontal type of the magnetic head, the first object is accomplished by the same way as in the conventional type, and further the magnetic reluctance is decreased by providing a magnetic flux guide between the MR element and the guide surface through the gap.

BEST MODE FOR CARRYING OUT THE INVENTION

The embodiments of the present invention will be explained below in the order of the conventional type and the horizontal type in reference to FIGS. 1(a, b) to 3(a, b) and FIGS. 5 to 12 respectively.

Figure 1A:
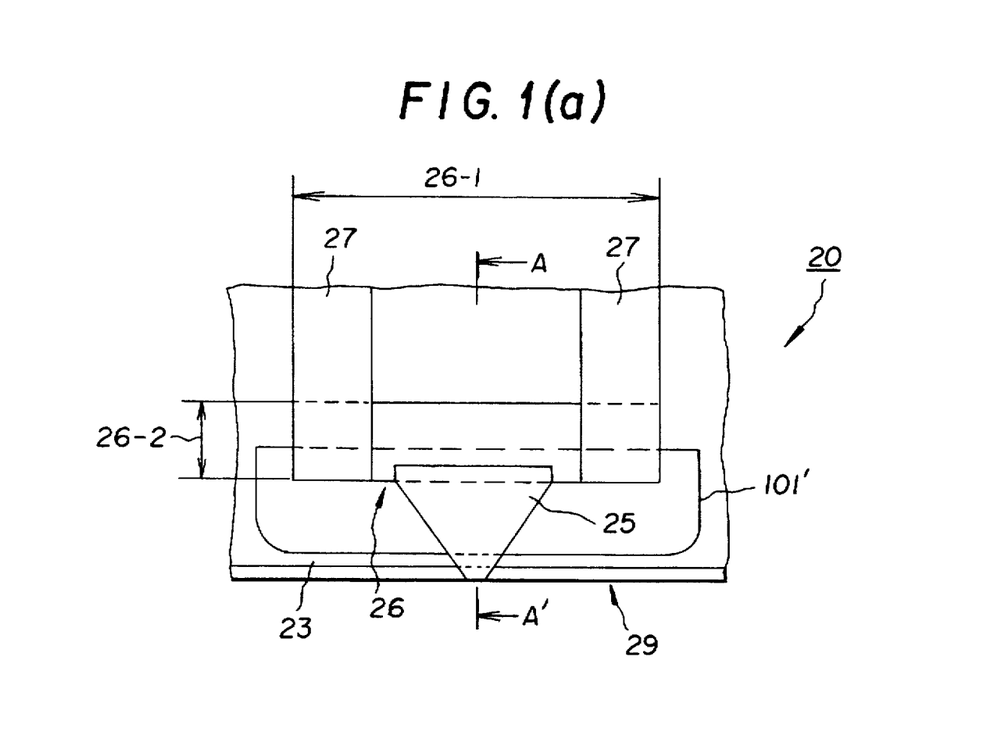
FIG. 1(a) is a schematic partial plane view of a conventional type separated MR-head firstly embodying the present invention and FIG. 1(b) is a schematic partial cross sectional view at A-A' in FIG. 1(a)

FIGS. 1(a) and (b) show a schematic partial plane view and a schematic partial cross sectional view at A–A' in FIG. 1(a) of a conventional type separated MR head first embodying the present invention, respectively.

A plurality of the conventional type separated MR heads are fabricated on electrically non-conductive substrate (SUBSTRATE) 21 made of e.g. alumina-titanium carbide ($Al_2O_3$—TiC) by the thin layer process technology, producing a wafer of the MR heads. A piece of the conventional type separated MR head (SEPARATED MR HEAD) 20 is individually obtained by cutting the wafer, producing a cut surface which becomes the guide surface (GUIDE SURFACE) 29 of SEPARATED MR HEAD 20 as shown in FIG. 1(b).

The fabrication steps and the structure around the MR element of SEPARATED MR HEAD 20 will be explained in reference to FIGS. 1(a) and 1(b) as follows: an electric insulation layer (INSULATOR) 22 made of e.g. alumina ($Al_2O_3$) is fabricated on SUBSTRATE 21; a first magnetically shielding layer (1st SHIELD) 23 made of e.g. nickel-iron (Ni—Fe) is fabricated on INSULATOR 22; a nonmagnetic insulation layer (NON-MAG INSULATOR) 24 made of $Al_2O_3$ is fabricated on 1st SHIELD 23; a second magnetically shielding layer (2nd SHIELD) 28 made of e.g. Ni—Fe is fabricated on NON-MAG INSULATOR 24 so that a space (SPACE) 101 filled with NON-MAG INSULATOR 24 is provided approximately 1 micro-meter far from GUIDE SURFACE 29, a gap (GAP) 51 is provided between SPACE 101 and GUIDE SURFACE 29 so as to have a space of 1 to 5 micro-meter between 1st and 2nd SHIELD 23 and 28, and a narrow space (NARROW SPACE) 102 in comparison with SPACE 101 is provided at an opposite side of SPACE 101, looking from GAP 51, so as to have a narrow space (NARROW SPACE) 102 for permitting a side of a magneto-resistive layer (MR LAYER) 26, which will be explained in a later step, to be placed therein; before 2nd SHIELD 28 is fabricated on INSULATOR 24, MR LAYER 26 made of e.g. Ni—Fe and having a size like 5 to 20 micro-meter length (26-1), 2 to 10 micro-meter width (26-2) and 0.03 to 0.1 micro-meter thickness (26-3) is fabricated in SPACE 101 approximately 20 micro-meter far from GUIDE SURFACE 29, so as to have a clearance like 0.01 to 0.3 micro-meter between a side of MR LAYER 26 and the inner surface of NARROW SPACE 1-2 and a flux guide (FLUX GUIDE) 25 made of e.g. Ni—Fe is fabricated in SPACE 101 so that its end is extended to GUIDE SURFACE 29 through GAP 51, leaving 0.1 to 0.5 micrometer to the inner surface of GAP 51 and its another end is magnetically connected with another end opposite to the end placed in NARROW SPACE 102, of MR LAYER 26; and an insulating protection layer (PROTECTION LAYER) 30 made of e.g. $Al_2O_3$ is fabricated on 2nd SHIELD 28.

Since SEPARATED MR HEAD 20 is fabricated thus, a magnetic closed loop made by GAP 51, FLUX GUIDE 25, MR LAYER 26, NARROW SPACE 102 and 1st and 2nd SHIELDs 23 and 28 forms a magnetic circuit.

Generally, in the conventional magnetic head, the flux guide has been used for guiding magnetic flux from the guide surface to the MR layer through the gap. Because, the magnetic reluctance in the magnetic circuit including the MR layer can be reduced, an electric short or noise problem produced by touching the MR layer with the recording medium can be avoided.

However, in the first embodiment, providing SPACE 101 and NARROW SPACE 102 around MR LAYER 26 is a point of the present invention. Because of providing SPACE 101, MR LAYER 26 can be placed by providing a distance from 1st and 2nd SHIELD 23 and 28, which gives a great concentration of the magnetic flux, coming from the recording medium through FLUX GUIDE 25, in MR LAYER 26. This results in increasing the reproducing efficiency of MR LAYER 26. Because of providing NARROW SPACE 102, the magnetic flux flowing through MR LAYER 26 can be sent to 1st and 2nd SHIELD 23 and 28 with small magnetic reluctance. This also results in reducing the magnetic reluctance of the magnetic circuit including MR LAYER 26.

Furthermore, in FIG. 1(a), FLUX GUIDE 25 having a shape like a fan is shown. A width of one edge (first edge) of FLUX GUIDE 25 at the side faced to the recording medium is made equal to or a little narrower than a width of a track of the recording medium, and a width of another edge (second edge) of FLUX GUIDE 25 at the side connected with MR LAYER 26 is made approximately equal to a side of an effective area for the magneto-resistive effect of MR LAYER 26. The effective area is an area of MR LAYER 26, left between two electrode layers (ELECTRODEs) 27. In the above, "a little" means as small as less than e.g. 1 micrometer in either case. Making the first edge thus is to collect the magnetic flux output from a narrow track of the recording medium in high efficiency, avoiding the cross talk from other tracks occurring. Making the second edge thus is to reduce the magnetic reluctance at the magnetic connection between FLUX GUIDE 25 and MR LAYER 26. Therefore, making the shape of FLUX GUIDE 25 like the fan also contributes to the increase of the reproducing efficiency of the separated type MR head 20.

Figure 2A:
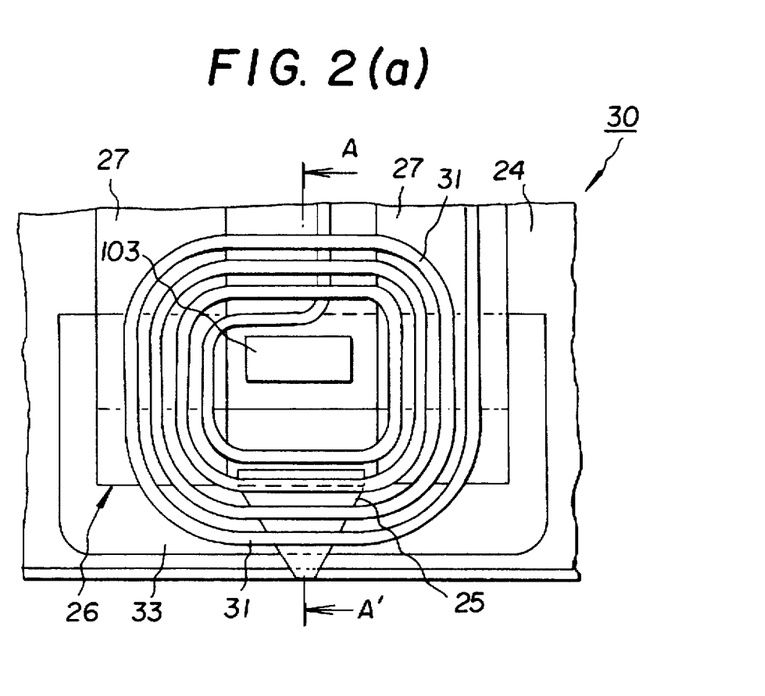
FIG. 2(a) is a schematic partial plane view of a conventional type composite MR head second embodying the present invention and FIG. 2(b) is a schematic partial cross sectional view at A-A' in FIG. 2(a)
Figure 2B:
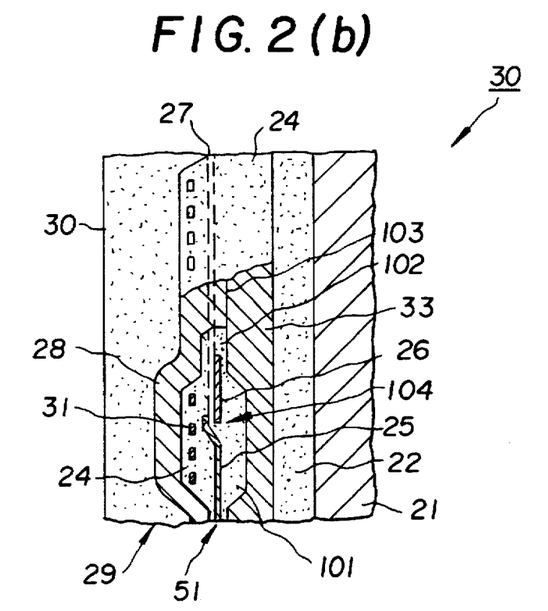

FIGS. 2(a) and 2(b) show a schematic partial plane view and a schematic partial cross sectional view at A–A' in FIG.

2(a) of a conventional type composite MR head embodying a second aspect of the present invention, respectively.

Since FIGS. 2(a) and 2(b) show the composite MR head, there are elements used in the recording and reproducing modes. In FIGS. 2(a) and 2(b), the same respective reference numeral as in FIGS. 1(a) and 1(b) designate the same elements as in FIGS. 1(a) and 1(b).

Same as in the first embodiment, a plurality of the conventional type composite MR heads are fabricated on SUBSTRATE 21 by the thin layer process technology, producing a wafer of the conventional type composite MR heads, and a conventional type composite MR head (COMPOSITE MR HEAD) 30 is individually obtained by cutting the wafer, producing the cut surface which becomes GUIDE SURFACE 29 of COMPOSITE MR HEAD 30 as shown in FIG. 2(b).

The fabrication steps of COMPOSITE MR HEAD 30 and the structure around the MR element will be explained in reference to FIG. 2(b) below. However, the same fabricating steps and structure as explained in the first embodiment are omitted repeating. Only the matters different from the first embodiment will be explained.

In FIGS. 2(a) and 2(b), the following matters are different from the first embodiment, regarding the structure of COMPOSITE MR HEAD 30: 1st SHIELD 33 and 2nd SHIELD 28 are connected to each other at a shield connecting portion (CONNECTING PORTION) 103, wherein the fabricating step and the material of 1st SHIELD 33 is same as 1st SHIELD 23 in the first embodiment; and a recording coil layer (COIL) 31 is fabricated in NON-MAG INSULATOR 24 so that COIL 31 is formed in spiral and a half of the spiral of COIL 31 is positioned in a space made between MR LAYER 26 and 2nd SHIELD 28 in SPACE 101.

Since COIL 31 is formed in spiral and fabricated around CONNECTING PORTION 103 by utilizing SPACE 101, 1st and 2nd SHIELDs 33 and 28 can be used in the reproducing and recording modes as the magnetic shield and the magnetic pole respectively. This contributes to the simplification of the conventional type composite MR head.

In the second embodiment, COMPOSITE MR HEAD 30 has the same structure as of SEPARATED MR HEAD 20 of the first embodiment around MR LAYER 26 such as SPACE 101 and NARROW SPACE 102, so that the second embodiment also contributes to the increase of the reproducing efficiency of the MR head.

Figure 3A:
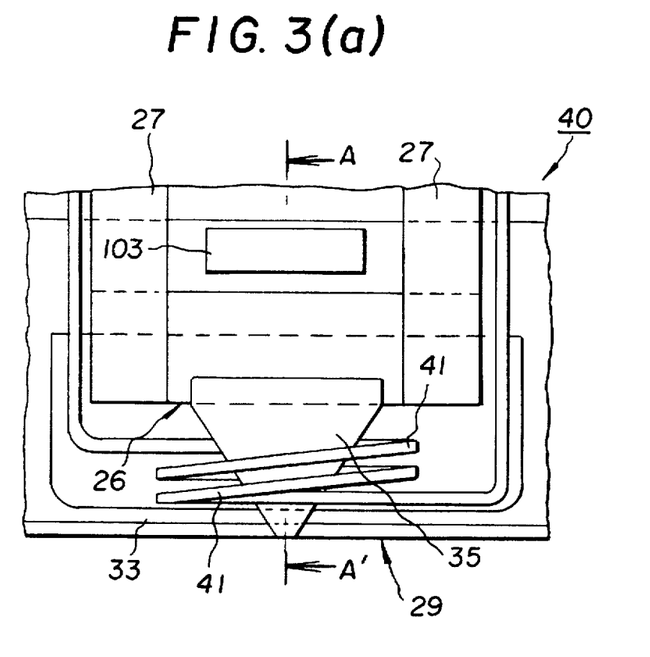
FIG. 3(a) is a schematic partial plane view of a conventional type composite MR head third embodying the present invention and FIG. 3(b) is a schematic partial cross sectional view at A-A' in FIG. 3(a)
Figure 3B:
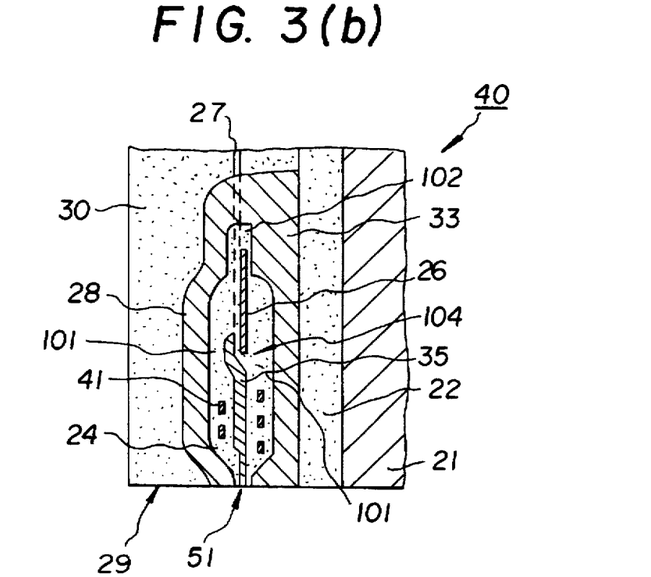

FIGS. 3(a) and 3(b) show a schematic partial plane view and a schematic partial cross sectional view at A–A' in FIG. 3(a) of another conventional type composite MR head thirdly embodying the present invention, respectively.

In FIGS. 3(a) and 3(b), the same respective reference numerals as in FIGS. 2(a) and 2(b) designate the same elements as in FIGS. 2(a) and 2(b).

Same as in the first embodiment, a plurality of the conventional type composite MR heads are fabricated on SUBSTRATE 21 by the thin layer process technology, producing a wafer of the conventional type composite MR heads, and a conventional type composite MR head (COMPOSITE MR HEAD) 40 is individually obtained by cutting the wafer, producing the cut surface which becomes GUIDE SURFACE 29 of COMPOSITE MR HEAD 40 as shown in FIG. 3(b).

The fabrication steps of COMPOSITE MR HEAD 40 and the structure around the MR element will be explained in reference to FIG. 3(b) below. However, the same fabricating steps and structure as explained in the second embodiment are omitted repeating. Only the matters different from the second embodiment will be explained.

In FIGS. 3(a) and 3(b), FLUX GUIDE 35 is fabricated thicker than FLUX GUIDE 25 in FIG. 2(b) except its edge provided in GAP 51 and a recording coil layer (COIL) 41 is fabricated in NON-MAG INSULATOR 24 so that COIL 41 is formed in helically around the thick part of FLUX GUIDE 35 in SPACE 101.

Since COIL 41 is formed in helically and fabricated around FLUX GUIDE 35 by utilizing SPACE 101, 1st and 2nd SHIELDs 33 and 28 can be used in the reproducing and recording modes as the magnetic shield and the magnetic pole respectively. This contributes to the simplification of the conventional type composite MR head, same as in the second embodiment.

In the third embodiment, COMPOSITE MR HEAD 40 has the same structure as of COMPOSITE MR HEAD 30 of the second embodiment around MR LAYER 26 such as SPACE 101 and NARROW SPACE 102, so that the third embodiment also contributes to the increase of the reproduction efficiency of the MR head.

Figure 1B:
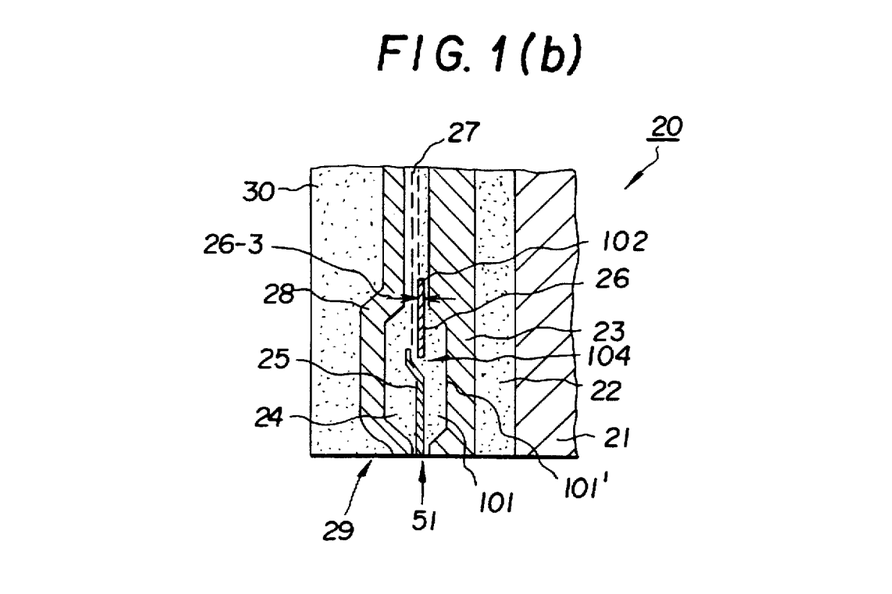

In first and second embodiments, FLUX GUIDE 25 is magnetically connected with MR LAYER 26 at place 104 as shown in FIGS. 1(b) and 2(b) respectively, and in third embodiment, FLUX GUIDE 35 is magnetically connected with MR LAYER 26 at place 104 as shown in FIG. 3(b). Precisely explaining the magnetic connection at place 104 in first, second and third embodiments, the end part of FLUX GUIDE 25 or 35 is overlapped on MR LAYER 26 by putting a very thin NON-MAG INSULATOR 24 between the end part of FLUX GUIDE 25 or 35 and MR LAYER 26.

Figure 4:
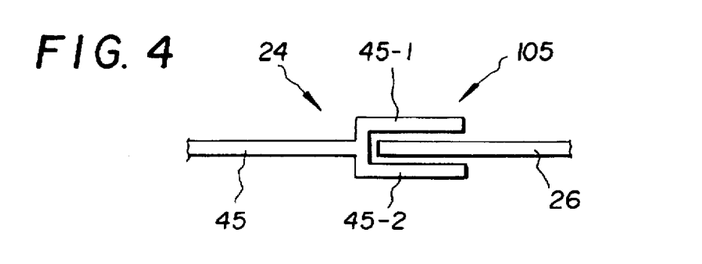
FIG. 4 is a schematic partial cross sectional view of improved magnetic connection between the flux guide and the MR layer.

In the conventional type separated and composite MR heads, the magnetic connection between the flux guide and the MR layer is improved so as to decrease the magnetic reluctance due to the magnetic connection. FIG. 4 is a schematic partial cross sectional view for illustrating improved magnetic connection between the flux guide and the MR layer. In FIG. 4, the same respective reference numerals as in FIGS. 1(b), 2(b) and 3(b) designate the same parts as in FIGS. 1(b), 2(b) and 3(b).

In FIG. 4, an end of FLUX GUIDE 45 at the side to MR LAYER 26 is forked to an upper leaf (UPPER LEAF) 45-1 and a down leaf (DOWN LEAF) 45-2 so that the side end of MR LAYER 26 is inserted in a cavity between UPPER LEAF 45-1 and DOWN LEAF 45-2, leaving NON-MAG INSULATOR 24 between MR LAYER 26 and FLUX GUIDE 45 and an overlap area made between UPPER LEAF 45-1 and MR LAYER 26 and that made between DOWN LEAF 45-2 and MR LAYER 26 are equal to each other in size and shape.

In accordance with improving the magnetic connection thus, the magnetic flux coming from the recording medium through FLUX GUIDE 45 is easily sent to MR LAYER 26, which contributes to the increase of the reproducing efficiency of the conventional type separated and composite MR heads.

The fourth to eighth embodiments of the present invention to the composite MR head will be explained in reference to FIGS. 5 to 8, for solving the problem that the leakage magnetic flux, which will be simply called "leakage flux" hereinafter, leaking through the gap because of the sense current flowing through the MR element magnetizes or damages the magnetized substance on the recording medium, in the reproducing mode.

FIGS. 5 to 8 are schematic partial cross sectional views of a conventional type composite MR head, for illustrating the fourth to the eighth embodiment. In FIGS. 5 to 8, the same respective reference numerals as in FIGS. 2(b) and 4 designate the same layers and places as in FIGS. 2(b) and 4.

Figure 5:
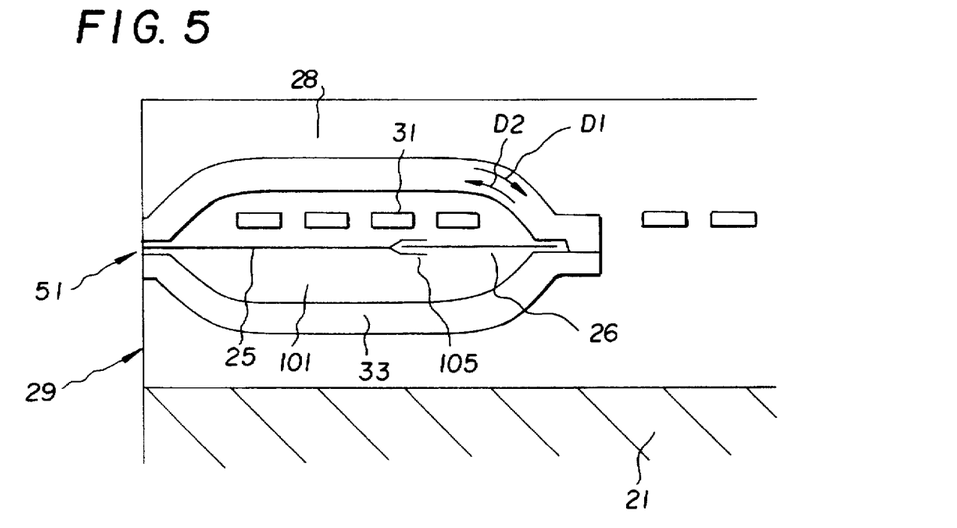
FIG. 5 is a schematic partial cross sectional view of a conventional type composite MR head fourth embodying the present invention.

In FIG. 5, an eliminating current flows, in the reproducing mode, through COIL 31 in a direction so as to eliminate the leakage flux by magnetic flux produced by COIL 31. The amount and the direction of the eliminating current depend on the amount and the direction of the sense current flowing through MR LAYER 26. For example, when the sense current flows through MR LAYER 26 from in front of the sheet of this drawing FIG. 5 to behind of the sheet, magnetic flux due to the sense current appears in, for instance, 2nd SHIELD 28 in a direction D1. Therefore, the current in COIL 31 should be made to flow in just an opposite direction to the sheet so as to produce magnetic flux having a direction D2 just opposite to D1.

Figure 6:
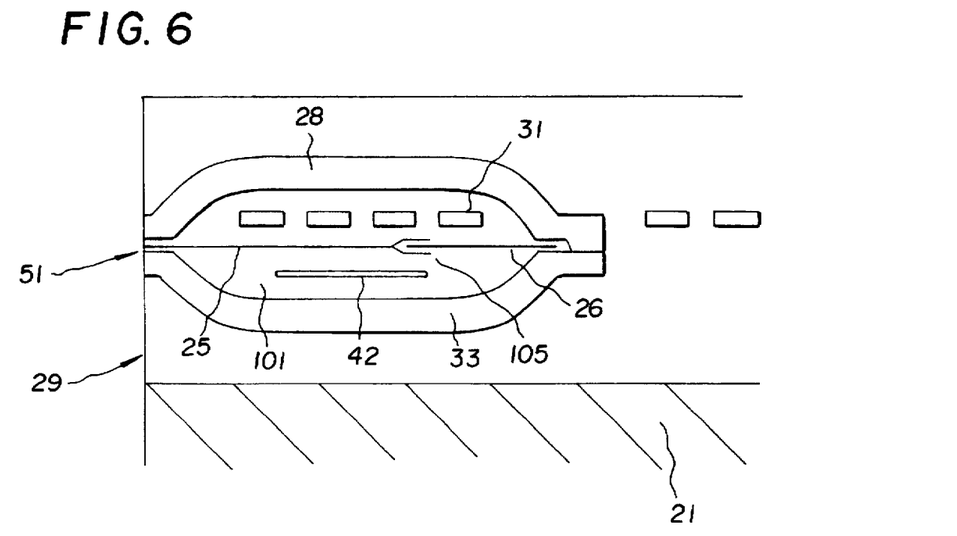
FIG. 6 is a schematic partial cross sectional view of a conventional type composite MR head fifth embodying the present invention.

In FIG. 6, an electrically conductive layer (CONDUCTIVE LAYER) 42 is newly fabricated at a proper position in SPACE 101 as shown in FIG. 6 and an eliminating current is made to flow through CONDUCTIVE LAYER 42 in a direction so as to eliminate the leakage flux by magnetic flux produced from CONDUCTIVE LAYER 42. The fabricating position of CONDUCTIVE LAYER 42, the amount and the direction of the eliminating current depend on the amount and the direction of the sense current flowing through MR LAYER 26.

Figure 7:
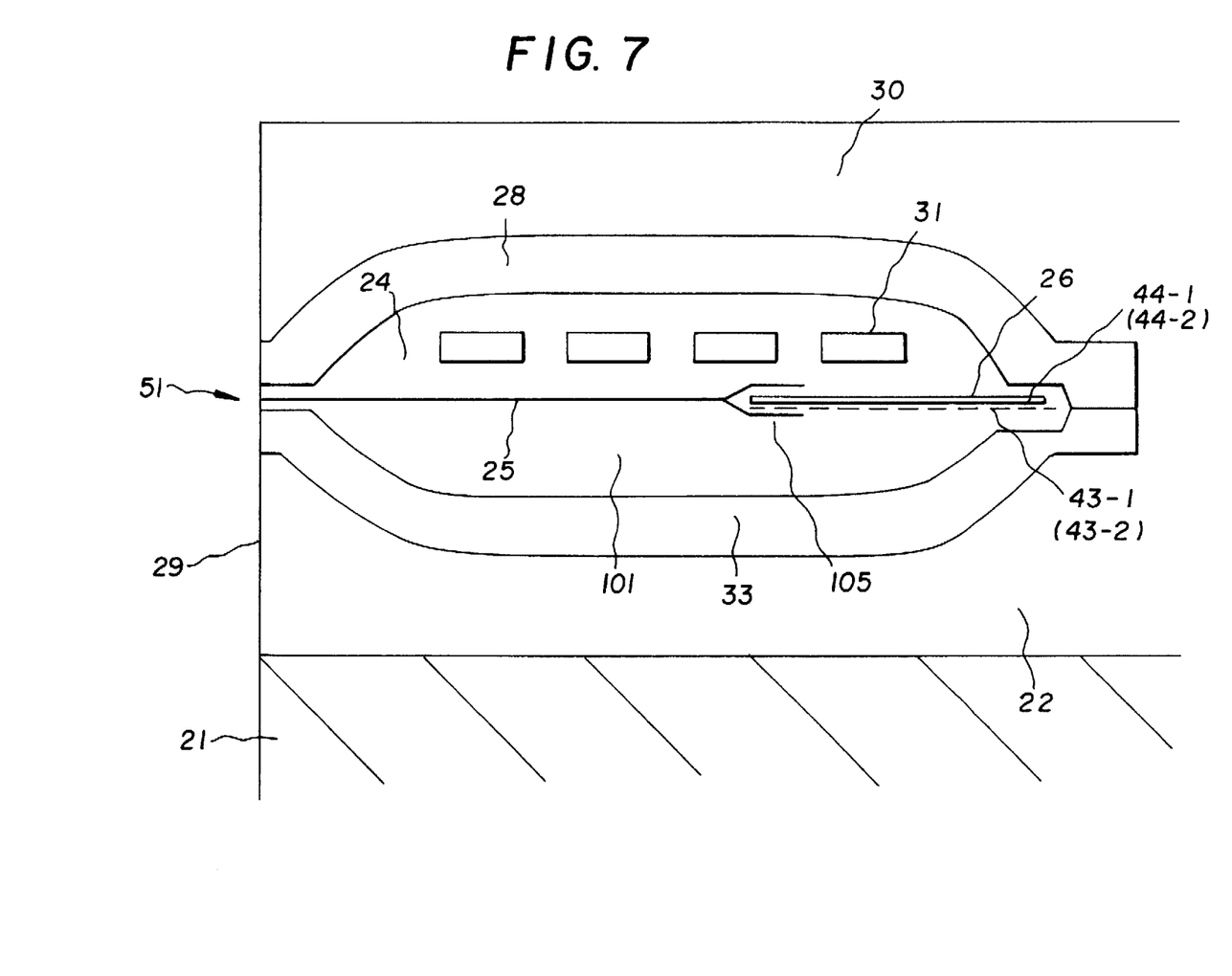
FIG. 7 is a schematic partial cross sectional view of a conventional type composite MR head sixth and seventh embodying the present invention.

FIG. 7 shows a case where the well-known soft adjacent layer (SAL) and current bias layer are used with the MR layer respectively. In case of SAL, MR LAYER 26 is fabricated to SAL 43-1 made of a soft magnetic layer by fabricating a non-magnetic layer (NON-MAG LAYER) 44-1 between SAL 43-1 and MR LAYER 26 so that SAL 43-1 is placed at a side of NON-MAG LAYER 44-1, opposite to COIL 31. In case of the current bias layer, MR LAYER 26 is fabricated to a current bias layer (CURRENT BIAS LAYER) (43-2) made of an electrically conductive layer by fabricating a non-magnetic insulation layer (NON-MAG INSULATION LAYER) (44-2) between CURRENT BIAS LAYER (43-2) and MR LAYER 26 so that CURRENT BIAS LAYER (43-2) is placed at a side of NON-MAG INSULATION LAYER (44-2), opposite to COIL 31. As well known, SAL 43-1 and CURRENT BIAS LAYER (43-2) serve to give the magnetic bias to MR LAYER 26. However, in FIG. 7, since the eliminating current is made to flow through COIL 31 same as the fourth embodiment, SAL 43-1 and CURRENT BIAS LAYER (43-2) can be fabricated thinner than the usual case where no eliminating current flows through COIL 31, respectively. Because, since SAL 43-1 and CURRENT BIAS LAYER (43-2) are arranged as described above, the eliminating current in COIL 31 supports the magnetic bias. As a result, the thickness of SAL 43-1 or 43-2 can be decreased, resulting in relatively increasing a current separated to flow through MR LAYER 26, in other words, increasing the reproducing efficiency of MR LAYER 26.

Figure 8:
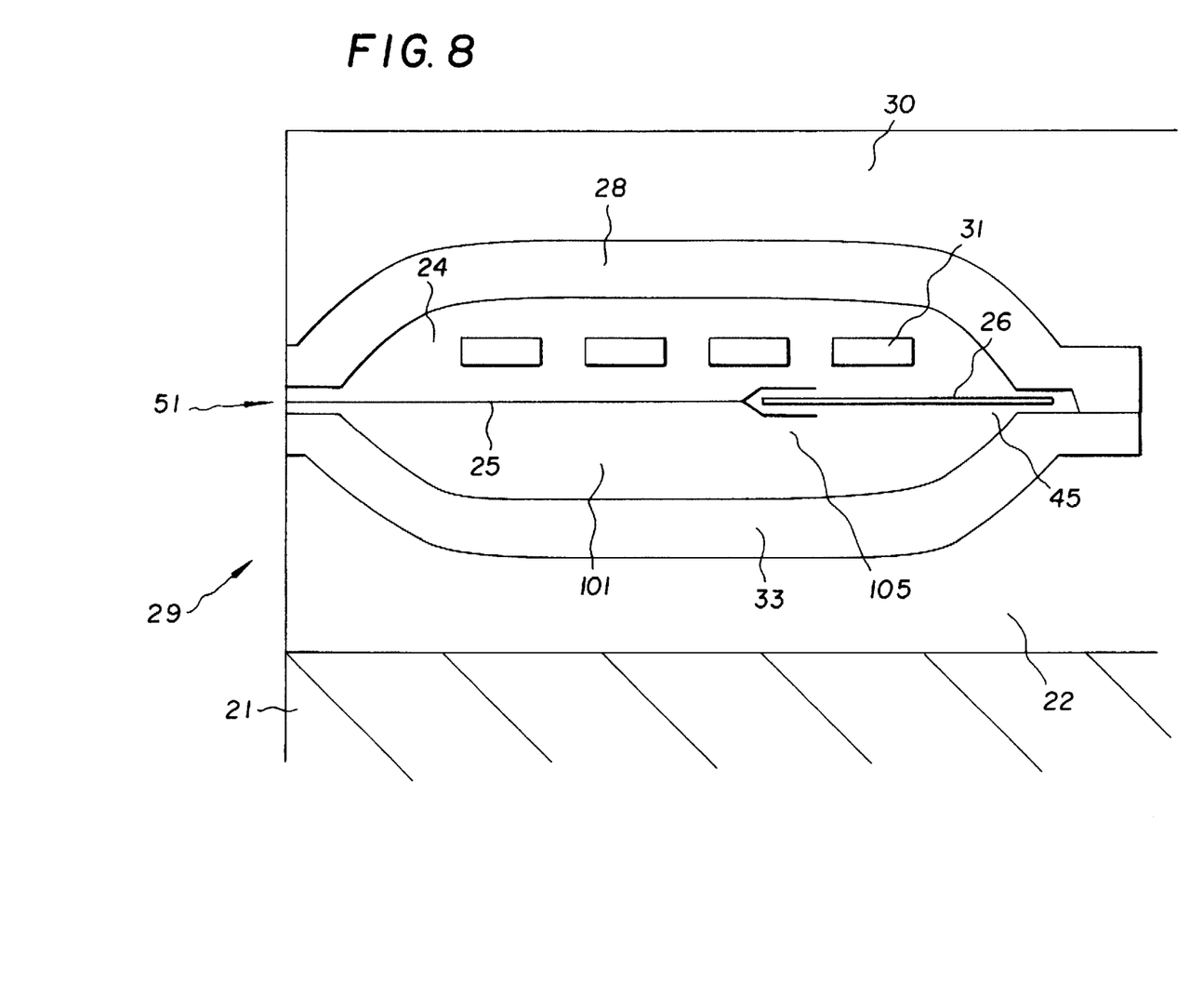
FIG. 8 is a schematic partial cross sectional view of a conventional type composite MR head eighth embodying the present invention.

FIG. 8 shows a case where a shunt current bias is used to the MR LAYER. In this case, MR LAYER 26 is fabricated on CONDUCTIVE LAYER 45 directly so that CONDUCTIVE LAYER 45 is placed at a side of MR LAYER 26, opposite to COIL 31. Same as explained above, since the eliminating current is made to flow through COIL 31, a bias current can be made to flow smaller than the usual case where no eliminating current flows through COIL 31. Because, the eliminating current is made to flow through COIL 31 so as to give support to the magnetic bias produced due to the bias current, which results in increasing the reproducing efficiency of MR LAYER 26, same as in FIG. 7.

The ninth to twelfth embodiments of the present invention will be explained in reference to FIGS. 9(a), 9(b) and 10 to 12 respectively, for explaining a horizontal type composite MR head having new structure. In FIGS. 9(a), 9(b) and 10 to 12, the steps for fabricating the horizontal type composite MR heads in the embodiments are omitted to be explained. Only main structure relating to the present invention will be discussed.

Figure 9A:
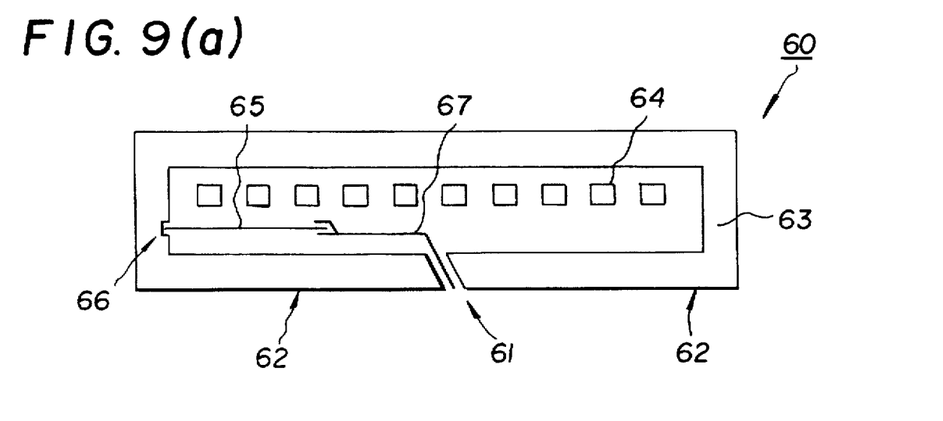
FIGS. 9(a) and 9(c) are a schematic partial cross sectional view of a horizontal type composite MR head ninth embodying the present invention respectively and FIG. 9(b) is a schematic partial perspective view of the horizontal type composite MR head in FIG. 9(a)
Figure 9B:
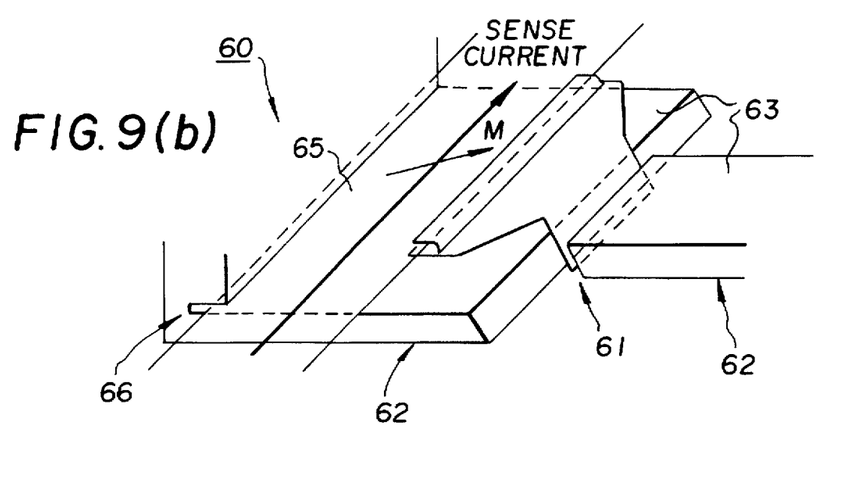
Figure 9C:
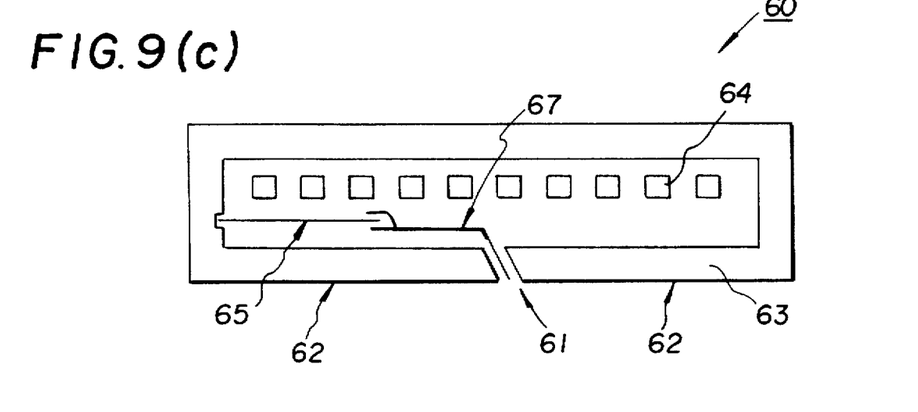

FIG. 9(a) is a schematic partial cross sectional view of a horizontal type composite MR head (H-TYPE MR HEAD) 60 ninth embodying the present invention, and FIG. 9(b) is a schematic partial perspective view of H-TYPE MR HEAD 60. In FIG. 9(a), GAP 61 is provided at GUIDE SURFACE 62 formed on the bottom of a magnetic shield (SHIELD) 63 which becomes a magnetic pole (POLE) in the recording mode when a recording current is made flow through COIL 64. The MR LAYER 65 is provided in SHIELD 63 so that one side of MR LAYER 65 is magnetically connected to SHIELD 63 in NARROW SPACE 66 provided in SHIELD 63 and another side of MR LAYER 65 is magnetically connected with FLUX GUIDE 67 extended to GUIDE SURFACE 62 through GAP 61. As shown in FIG. 9(b), the width of FLUX GUIDE 67 at the MR LAYER 65 side is wider than that at the GAP 61 side. That is, the width of FLUX GUIDE 67 at the MR LAYER 65 side is approximately equal to the side of the effective area of MR LAYER 65, and the width at the GAP 61 side is equal to or a little narrower than the width of the track of the recording medium. This is because of the same reason as in FLUX GUIDE 25 in FIGS. 1(a) and 1(b). Further, the thickness of FLUX GUIDE 67 is made thick, in particular, at a bent part of FLUX GUIDE 67, as shown in FIG. 9(c) in which the same respective reference numerals as in FIG. 9(a) designate the same parts as in FIG. 9(a). This is for reducing the magnetic reluctance of FLUX GUIDE 67 and for making the fabrication of FLUX GUIDE 67 easy. The NARROW SPACE 66 is provided same as NARROW SPACE 102 in FIG. 3(b).

The sense current flows through MR LAYER 65 as shown by a thick arrow and a magnetic bias is applied to MR LAYER 65 so that MR LAYER 65 is previously magnetized by a conventional way, as shown by an arrow "M". It is preferred to make the angle of approximately 45 degree between M and the magnetic flux coming into MR LAYER 65 from GAP 61.

Further in FIG. 9(b), SHIELD 63 placed under MR LAYER 65 is wider than the effective area of MR LAYER 65 and SHIELD 63 placed at GAP 61 is wider than the width of FLUX GUIDE 67 at the GAP 61 side. This is for protecting MR LAYER 65 from undesirable magnetic flux entered from other tracks of the recording medium to MR LAYER 65.

Figure 10:
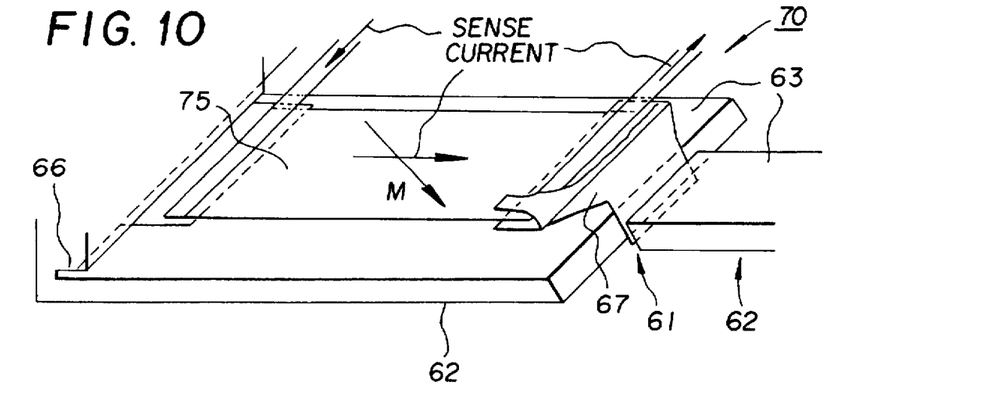
FIG. 10 is a schematic partial perspective view of a horizontal type composite MR head tenth embodying the present invention.

FIG. 10 is a schematic partial perspective view of H-TYPE MR HEAD 70 tenth embodying the present invention. In FIG. 10, the same respective reference numerals as in FIG. 9(b) designate the same elements or parts as in FIG. 9(b). In FIG. 10, the sense current flows through MR LAYER 75 in parallel with the magnetic flux input from GAP 61 to MR LAYER 75 and MR LAYER 75 is magnetically biased so that 45 degree of angle is made between the magnetized direction M of MR LAYER 75 and the direction of the magnetic flux coming in MR LAYER 75 through FLUX GUIDE 67. Making the sense current flow thus, there is a merit that MR LAYER 75 becomes easy to be protected from the undesirable magnetic flux from other tracks by SHIELD 63.

Figure 11:
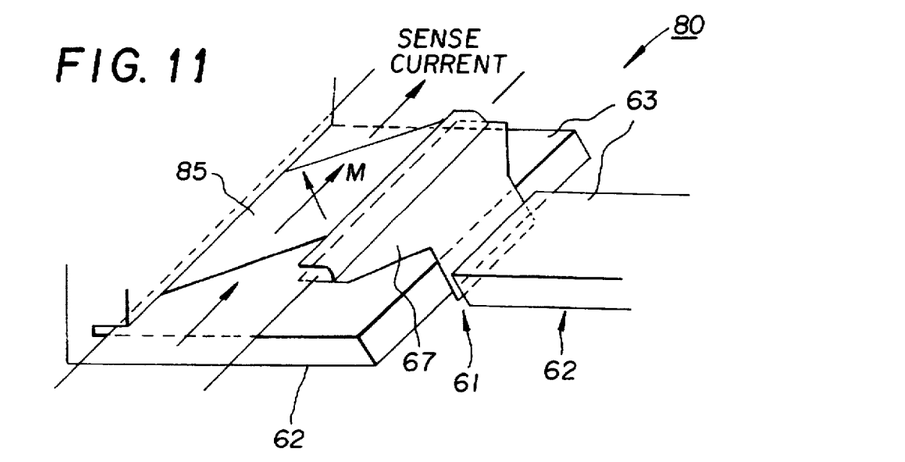
FIG. 11 is a schematic partial perspective view of a horizontal type composite MR head eleventh embodying the present invention.

FIG. 11 is a schematic partial perspective view of H-TYPE MR HEAD 80 eleventh embodying the present invention. In FIG. 11, the same respective reference numerals as in FIG. 10 designate the same elements or parts as in FIG. 10. In FIG. 11, the well-known barber pole bias system is applied to H-TYPE MR HEAD 80. In this case, the magnetized direction of MR LAYER 85 makes an angle of 90 degree with the magnetic flux coming into MR LAYER 85 through FLUX GUIDE 67, so that the sense current is directed so as to make an angle of 45 degree with the magnetic flux coming into MR LAYER 85 by varying the pattern of lead lines, not depicted in the figure, for the sense current. Three thick arrows show the direction of the sense current.

Figure 12:
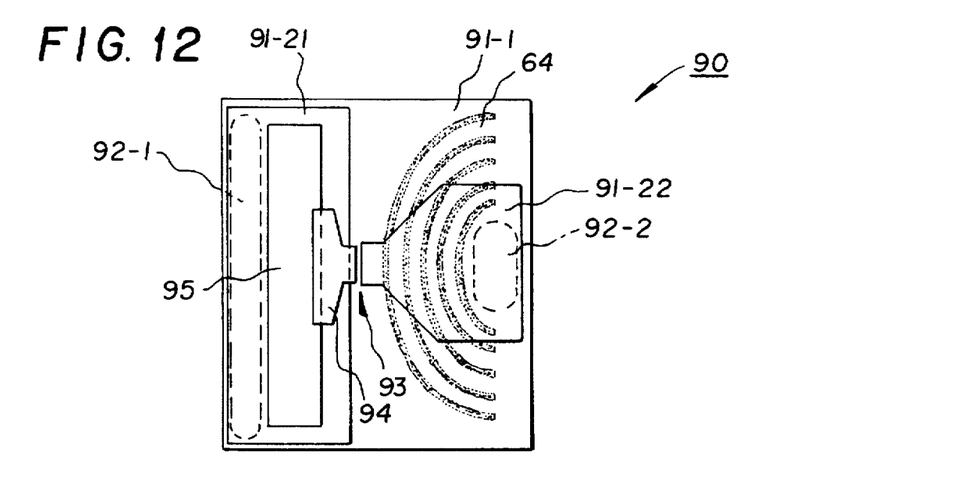
FIG. 12 is a schematic partial plane view of a horizontal type composite MR head twelfth embodying the present invention.

FIG. 12 is a schematic partial plane view of H-TYPE MR HEAD 90 twelfth embodying the present invention, looking from the guide surface. In FIG. 12, a pole (POLE) is separated to an upper pole (UPPER POLE) 91-1 and two down poles (DOWN POLEs) 91-21 and 91-22 which are connected to UPPER POLE 91-1 at connecting parts 92-1 and 92-2 respectively. The DOWN POLEs 91-21 and 91-22 make GAP 93 in which the narrow end of FLUX GUIDE 94 is provided. The MR LAYER 95 is provided above DOWN POLE 91-21 and connected with the wide end of FLUX GUIDE 95. The DOWN POLE 91-21 is fabricated larger than the effective area of MR LAYER 94 for protecting MR LAYER 95 from undesirable magnetic flux coming from other tracks of the recording medium.

What is claimed is:

1. A horizontal composite magneto-resistive head for magnetically performing recording in a recording mode and reproducing in a reproducing mode, including a guide surface for guiding a recording medium, a gap for making magnetic flux pass through the gap in the recording mode and the reproducing mode and a recording coil used in the recording mode, said head being fabricated on a substrate so that the guide surface is in parallel to a surface of the substrate, said head comprising:

magnetic shield substance layers used as a magnetic core in the recording mode by a recording current flowing through the recording coil provided nearby said magnetic shield substance layers and as a magnetic shield in the reproducing mode, forming the guide surface at the outside of said magnetic shield substance layers and the gap at the guide surface;

a magneto-resistive layer operating under a magneto-resistive effect in the reproducing mode, for performing the reproducing by causing a sense current to flow through the magneto-resistive layer in response to magnetic flux coming from the recording medium through the gap, said magneto-resistive layer having an effective area valid for the magneto-resistive effect;

a magnetic flux guide layer provided between the guide surface and the magneto-resistive layer through the gap for guiding the magnetic flux received at the gap to the magneto-resistive layer in the reproducing mode, said magnetic flux guide layer being formed so that an end of said magnetic flux guide layer is extended to the gap and has a width equal to or narrower than a width of a track of the recording medium and another end of said magnetic flux guide layer is magnetically connected with the magneto-resistive layer and has a width approximately equal to a side of the effective area;

a space formed by the magnetic shield substance layers for placing the effective area of said magneto-resistive layer in the middle thereof said space having a size enough to prevent the magnetic flux flowing through the magneto-resistive layer from leaking to the magnetic shield substance layers; and a narrow space provided at a corner of said space for accepting a side of the magneto-resistive layer, opposite to the side connected with said magnetic flux guide layer, said narrow space having a size larger than a size of said opposite side of the magneto-resistive layer, wherein a part of said magnetic shield substance layers is between the gap and said magneto-resistive layer and expanded wider than the effective area of said magneto-resistive layer and another part of said magnetic shield substance layers is narrowed so that the edge of said another part has a width wider than the end width of said magnetic flux guide layer at the gap.

2. A horizontal composite magneto-resistive head according to claim 1, wherein the sense current flows through said magneto-resistive layer in a direction perpendicular to the magnetic flux flowing through said magneto-resistive layer.

3. A horizontal composite magneto-resistive head according to claim 1, wherein the sense current flows through said magneto-resistive layer in a direction parallel to the magnetic flux flowing through said magneto-resistive layer.

4. A horizontal composite magneto-resistive head according to claim 1, wherein said magneto-resistive layer is parallel to the guide surface.

* * * * *